(12) United States Patent
Jimenez-Rios (10) Patent No.: US 11,856,947 B2
(45) Date of Patent: Jan. 2, 2024

(54) SYSTEM FOR AUTOMATED PERMEATION OF A BIOLOGICAL MATERIAL AND METHOD OF USING SAME

(71) Applicant: Cook Medical Technologies LLC, Bloomington, IN (US)

(72) Inventor: Jorge L. Jimenez-Rios, Bloomington, IN (US)

(73) Assignee: COOK MEDICAL TECHNOLOGIES LLC, Bloomington, IN (US)

( * ) Notice: Subject to any disclaimer, the term of this patent is extended or adjusted under 35 U.S.C. 154(b) by 218 days.

(21) Appl. No.: 17/174,638

(22) Filed: Feb. 12, 2021

(65) Prior Publication Data

US 2021/0251216 A1    Aug. 19, 2021

Related U.S. Application Data

(60) Provisional application No. 62/977,597, filed on Feb. 17, 2020.

(51) Int. Cl.
*A01N 1/02* (2006.01)
*B01L 3/00* (2006.01)

(52) U.S. Cl.
CPC ......... *A01N 1/0268* (2013.01); *A01N 1/0221* (2013.01); *A01N 1/0242* (2013.01); *B01L 3/502* (2013.01)

(58) Field of Classification Search
CPC .. A01N 1/0268; A01N 1/0221; A01N 1/0242; B01L 3/502; B01L 2200/0668; B01L 2200/16; B01L 2400/0487; B01L 3/502761; B01L 2300/043
USPC ...................................................... 435/284.1
See application file for complete search history.

(56) References Cited

U.S. PATENT DOCUMENTS

| | | | |
|---|---|---|---|
| 5,728,351 | A | 3/1998 | Carver, Jr. |
| 5,823,954 | A | 10/1998 | Chaffringeon |
| 6,537,501 | B1 | 3/2003 | Holl et al. |
| 6,838,235 | B2 | 1/2005 | Gardner et al. |
| 7,223,371 | B2 | 5/2007 | Hayenga et al. |

(Continued)

FOREIGN PATENT DOCUMENTS

| | | |
|---|---|---|
| EP | 0 777 413 A1 | 6/1997 |
| WO | WO 2010/018219 A2 | 2/2010 |

(Continued)

OTHER PUBLICATIONS

European Patent Office Examination Report regarding Application No. 21 157 723.4 dated Apr. 26, 2023, 5 pages.

(Continued)

*Primary Examiner* — Benjamin R Whatley
*Assistant Examiner* — Jacqueline Brazin
(74) *Attorney, Agent, or Firm* — Crowell & Moring LLP (57) ABSTRACT

A device for permeation of a biological material may include a lower portion and an upper portion configured to be releasably coupled to the lower portion. The lower portion may include a groove configured to receivingly support a biological material. The lower portion and the upper portion may be coupled such that a first reservoir and a second reservoir are formed collectively by the lower portion and the upper portion. The first reservoir, the second reservoir, and the groove may be in fluid communication with each other.

20 Claims, 6 Drawing Sheets

(56) References Cited

U.S. PATENT DOCUMENTS

| | | |
|---|---|---|
| 7,682,009 B1 | 3/2010 | Sliwa, Jr. et al. |
| 7,731,906 B2 | 6/2010 | Handique et al. |
| 7,976,789 B2 | 7/2011 | Kenis et al. |
| 8,071,281 B2 | 12/2011 | Cecchi |
| 8,143,070 B2 | 3/2012 | Tokhtuev et al. |
| 8,256,232 B2 | 9/2012 | Burg |
| 8,852,078 B2 | 10/2014 | Prather et al. |
| 9,169,460 B2 | 10/2015 | Cecchi |
| 9,228,925 B2 | 1/2016 | Kim et al. |
| 10,136,636 B2 | 11/2018 | Lai et al. |
| 2004/0234941 A1 | 11/2004 | Abed |
| 2007/0264705 A1 | 11/2007 | Dodgson |
| 2009/0123961 A1 | 5/2009 | Meyvantsson et al. |
| 2011/0104730 A1 | 5/2011 | Larsen et al. |
| 2011/0250690 A1 | 10/2011 | Craig |
| 2012/0021529 A1 | 1/2012 | Nachef et al. |
| 2012/0067433 A1 | 3/2012 | Friedrich et al. |
| 2012/0121484 A1* | 5/2012 | Kojima .................. B01L 9/527 422/547 |
| 2012/0156750 A1 | 6/2012 | Battrell et al. |
| 2012/0251999 A1 | 10/2012 | Demirci et al. |
| 2013/0098481 A1* | 4/2013 | Delamarche ......... B01J 19/0093 137/561 A |
| 2013/0137080 A1 | 5/2013 | Henderson et al. |
| 2013/0204076 A1* | 8/2013 | Han .................. B01L 3/502761 600/35 |
| 2013/0230912 A1 | 9/2013 | Nukaga et al. |
| 2014/0220702 A1* | 8/2014 | Johnson ............ B01L 3/502715 422/512 |
| 2015/0093815 A1 | 4/2015 | Kiani et al. |
| 2015/0313211 A1 | 11/2015 | Ng et al. |
| 2016/0316743 A1 | 11/2016 | Henderson et al. |
| 2019/0059363 A1 | 2/2019 | Lai et al. |
| 2020/0404902 A1 | 12/2020 | Roberts et al. |

FOREIGN PATENT DOCUMENTS

| | | |
|---|---|---|
| WO | WO 2016/001933 A1 | 1/2016 |
| WO | WO 2020/263891 A1 | 12/2020 |

OTHER PUBLICATIONS

Extended European Search Report from corresponding European application No. 21157723.4-1101, dated Aug. 13, 2021, 8 pp.

International Search Report from corresponding International Application No. PCT/US2020/039239, dated Aug. 18, 2020, 2 pgs.

* cited by examiner

FIG. 8

SYSTEM FOR AUTOMATED PERMEATION OF A BIOLOGICAL MATERIAL AND METHOD OF USING SAME

CROSS-REFERENCE TO RELATED APPLICATIONS

This patent application claims priority from U.S. Provisional Application No. 62/977,597, filed Feb. 17, 2020, the entirety of which is hereby fully incorporated by reference herein.

TECHNICAL FIELD

In order to cryopreserve cells through vitrification, the cells must be permeated into vitrification solutions, consisting on media buffer with a high concentration of cryoprotectant agents that help the cell survive the vitrification process. The current procedure involves a highly skilled user manually aspirating and injecting the cells into various solutions of media, with increasing concentrations of cryoprotectant agents until the final concentration is reached. This procedure requires a significant amount of time by the user. The cells of interest can range in size from 50 to 200 microns, creating the need for the procedure to be performed under a microscope using micromanipulation pipettes operated by hand. Successful permeation of cells in the vitrification solutions requires careful timing and precision handling of micropipettes Accordingly, it is desirable to provide devices and methods that will automate the cell permeation process. In particular, it is desirable to provide devices and methods that will allow a user to monitor the cell during the automated permeation process, that will provide improved control of the permeation rate, and/or that will reduce the procedure time, labor, and cost.

BRIEF SUMMARY

One general aspect of the present disclosure includes a device for permeation of a biological material, including: a lower portion; and an upper portion configured to be releasably coupled to the lower portion, where the lower portion includes a groove configured to receivingly support a biological material, where the lower portion and the upper portion are coupled such that a first reservoir and a second reservoir are formed collectively by the lower portion and the upper portion, and where the first reservoir, the second reservoir, and the groove are in fluid communication with each other.

Another general aspect of the present disclosure includes a kit for permeation of a biological material, including: a first device including a lower portion and an upper portion configured to be releasably coupled to the lower portion; and a second device configured for receivingly support the first device, where the second device includes a cavity and at least one arm movable between an open position and a closed position, and where when the at least one arm is in the closed position, the first device is secured within the cavity with the upper portion of the first device sealingly engaging the lower portion of the first device.

Another general aspect of the present disclosure includes a method of permeating a biological material using a device including a lower portion and an upper portion configured to be releasably coupled to the lower portion to collectively form a first reservoir, a second reservoir, and a channel, the lower portion including a groove in fluid communication with the first and second reservoirs and the channel, including: placing a biological material in the groove of the lower portion; coupling the upper portion to the lower portion; placing a first liquid into the first reservoir; and applying a first suction to the second reservoir such that the first liquid flows along the channel into the groove.

Other systems, methods, features and advantages of the presently disclosed embodiments will be, or will become, apparent to one with skill in the art upon examination of the following figures and detailed description. It is intended that all such additional systems, methods, features, and advantages be within the scope of the invention.

BRIEF DESCRIPTION OF THE DRAWINGS

The present disclosure can be better understood with reference to the following drawings and description. The components in the figures are not necessarily to scale, emphasis instead being placed upon illustrating the principles of the present disclosure, although certain figures may be illustrated to scale and relied upon as such. Moreover, in the figures, like-referenced numerals designate corresponding parts throughout the different views.

DETAILED DESCRIPTION

Various aspects are described below with reference to the drawings in which like elements generally are identified by like numerals. The relationship and functioning of the various elements of the aspects may better be understood by reference to the following detailed description. However, aspects are not limited to those illustrated in the drawings or explicitly described below. It also should be understood that the drawings are not necessarily to scale (although certain drawings may be drawn to scale and relied upon as such), and in certain instances details may have been omitted that are not necessary for an understanding of aspects disclosed herein, such as conventional material, construction, and assembly.

For purposes of promoting an understanding of the presently disclosed embodiments, reference will now be made to the embodiments illustrated in the drawings, and specific language will be used to describe the same. It should nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. The term "configured to" is used to describe structural limitations in a particular manner that requires specific construction to accomplish a stated function and/or to interface or interact with another component(s), and is not used to describe mere intended or theoretical uses. Relative terminology and broader terms such as "generally," "about," "substantially," and the like will be understood by those of skill in the art as providing clear and definite scope of disclosure and/or claiming. For example, the term "generally square" will be understood as not requiring exactly square, but rather including that and functional equivalents.

Figure 1:
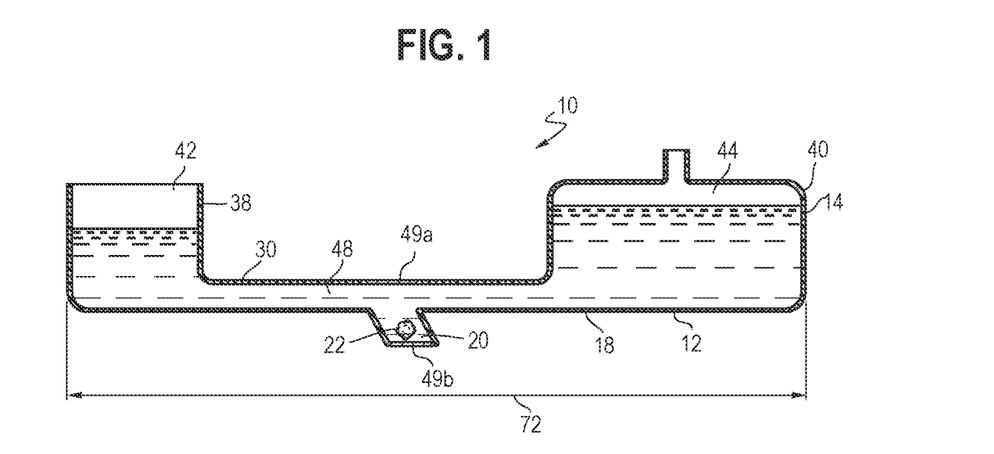
FIG. 1 is an illustration showing a diagrammatic side view of an embodiment of a system for automated permeation of a biological material in accordance with certain aspects of the present disclosure.
Figure 2:
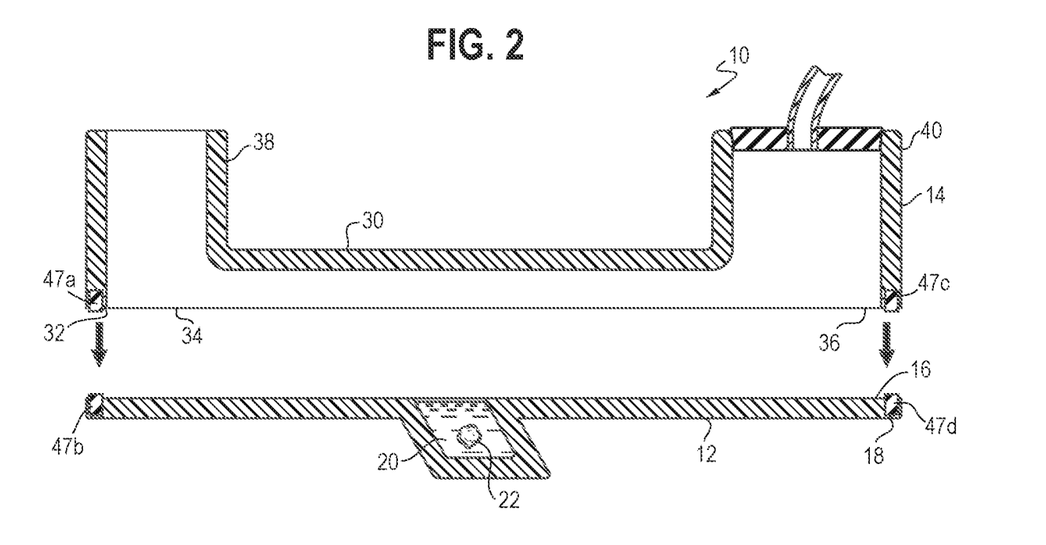
FIG. 2 is an illustration showing a diagrammatic cut-away view of the embodiment of the system of FIG. 1 in accordance with certain aspects of the present disclosure.

Referring to FIGS. 1-8, embodiments of a system 10 for automated permeation of a biological material are shown. The system 10 may include a lower portion 12 and an upper portion 14 configured to be releasably coupled to the lower portion 12. The lower portion 12 may include a top surface 16, a bottom surface 18, and a groove 20 extending from the top surface 16 towards the bottom surface 18. The groove 20 may be configured to receivingly support a biological material 22 (e.g., as shown in FIGS. 1-2). The biological material 22 may be various kinds of biological materials, such as an embryo or an oocyte. The groove 20 may be configured to accommodate the various kinds of biological materials, such that the biological material 22 may be placed therein to be permeated with desired liquids, as discussed in greater detail below.

Figure 5:
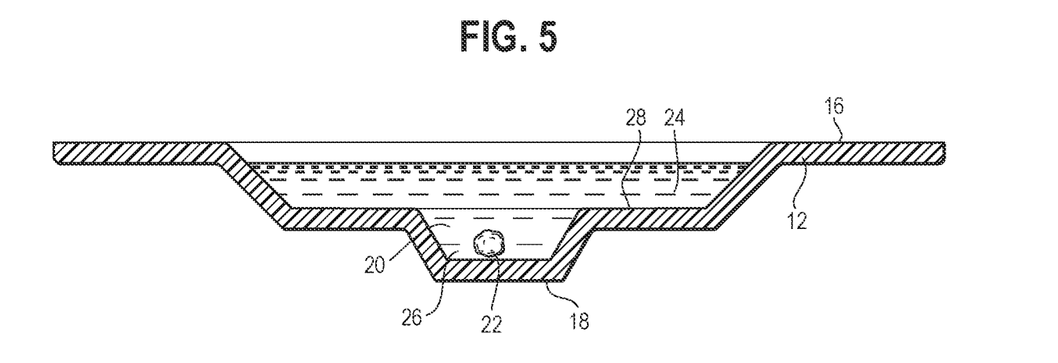
FIG. 5 is an illustration showing a diagrammatic cut-away view of a lower portion of another embodiment of a system for automated permeation of a biological material in accordance with certain aspects of the present disclosure.

The configuration of the groove 20 may be varied, as desired and/or needed, without departing from the scope of the present invention. For example, in some embodiments, as shown in FIG. 5, the groove 20 may include a first section 24 and a second section 26, where the first section 24 may extend from the top surface 16 of the lower portion 12 to an intermediate surface 28 of the lower portion 12 and the second section 26 may extend from the intermediate surface 28 of the lower portion 12 towards the bottom surface 18 of the lower portion 12. This embodiment increases the depth of the groove 20 and creates another channel over the biological material 22, which may be advantageous for slowing down the permeation rate of a solution into the biological material 22, as discussed in greater detail below.

Figure 6:
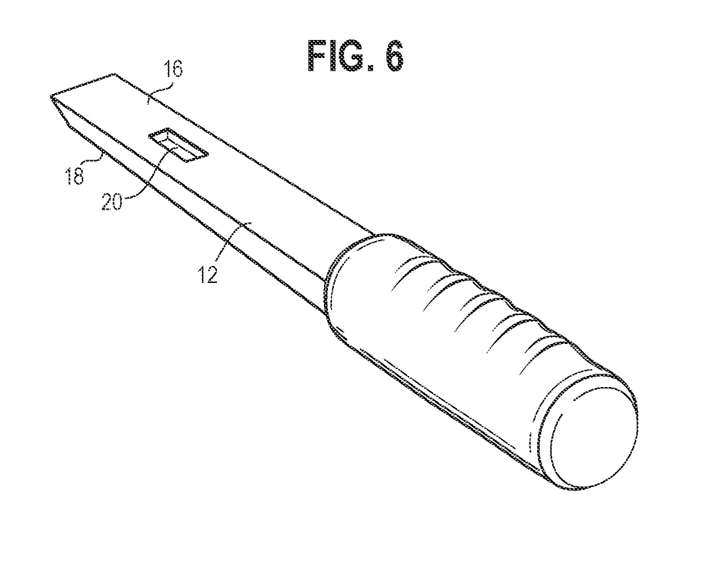
FIG. 6 is an illustration showing a diagrammatic perspective view of a lower portion of another embodiment of a system for automated permeation of a biological material in accordance with certain aspects of the present disclosure.

In some embodiments, when the system 10 is used to prepare the biological material 22 for vitrification (e.g., cryopreservation of the biological material 22 by permeating the biological material 22 with cryoprotectant solutions), a vitrification stick, as shown in FIG. 6, may be used as the lower portion 12 of the system 10, which may allow the user to permeate the biological material 22 directly on the vitrification stick, such that when the permeation process is completed, the vitrification stick supporting the biological material 22 may be directly placed into a vitrification solution, such as liquid nitrogen, for vitrification of the biological material 22 without additional transfer of the biological material 22.

Referring to FIGS. 1-4, the upper portion 14 may include an upper surface 30 and a lower surface 32, where the lower surface 32 may include a first opening 34 and a second opening 36. The upper portion 14 may also include a first protrusion 38 extending outwardly from the upper surface 30 of the upper portion 14 and in fluid communication with the first opening 34 and a second protrusion 40 extending outwardly from the upper surface 30 of the upper portion 14 and in fluid communication with the second opening 36. As shown in FIGS. 1-2, the lower portion 12 and the upper portion 14 are configured such that when they are coupled together (e.g., placing the upper portion 14 upon the lower portion 12), the first protrusion 38 and the top surface 16 of the lower portion 12 may collectively form a first reservoir 42 and the second protrusion 40 and the top surface 16 of the lower portion 12 may collectively form a second reservoir 44.

In some embodiments, as shown in FIG. 1, the first reservoir 42, the second reservoir 44, and the groove 20 may be in fluid communication with each other, and the first and second reservoirs 42 and 44 may be configured such that liquids may be directed into and out of the system 10 (collectively formed by the lower and upper portions 12 and 14) via the first and second reservoirs 42 and 44. In some embodiments, the groove 20 may be disposed between the first and second reservoirs 42 and 44, and liquids may be directed into or out of the groove 20 through the first reservoir 42 or the second reservoir 44, as discussed in greater detail below.

Figure 4:
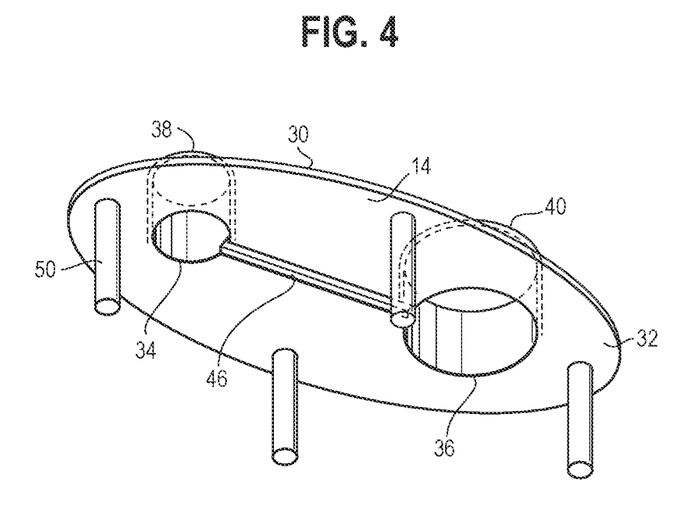
FIG. 4 is an illustration showing a diagrammatic perspective view of an upper portion of the embodiment of the system of FIG. 3 in accordance with certain aspects of the present disclosure.

In some embodiments, as shown in FIG. 4, the lower surface 32 of the upper portion 14 may include a slot 46 disposed between and in fluid communication with the first and second openings 34 and 36. The slot 46 may extend from the lower surface 32 of the upper portion 14 towards the upper surface 30 of the upper portion 14. In some embodiments, the slot 46 may be configured such that when the upper portion 14 is coupled to (e.g., placed upon) the lower portion 12, the slot 46 and the top surface 16 of the lower portion 12 may collectively form a channel 48, as shown in FIG. 1, where the channel 48 is in fluid communication with the groove 20 and the first and second reservoirs 42 and 44. In some embodiments, as shown in FIG. 1, the groove 20 may be disposed in registry with the channel 48.

Figure 3:
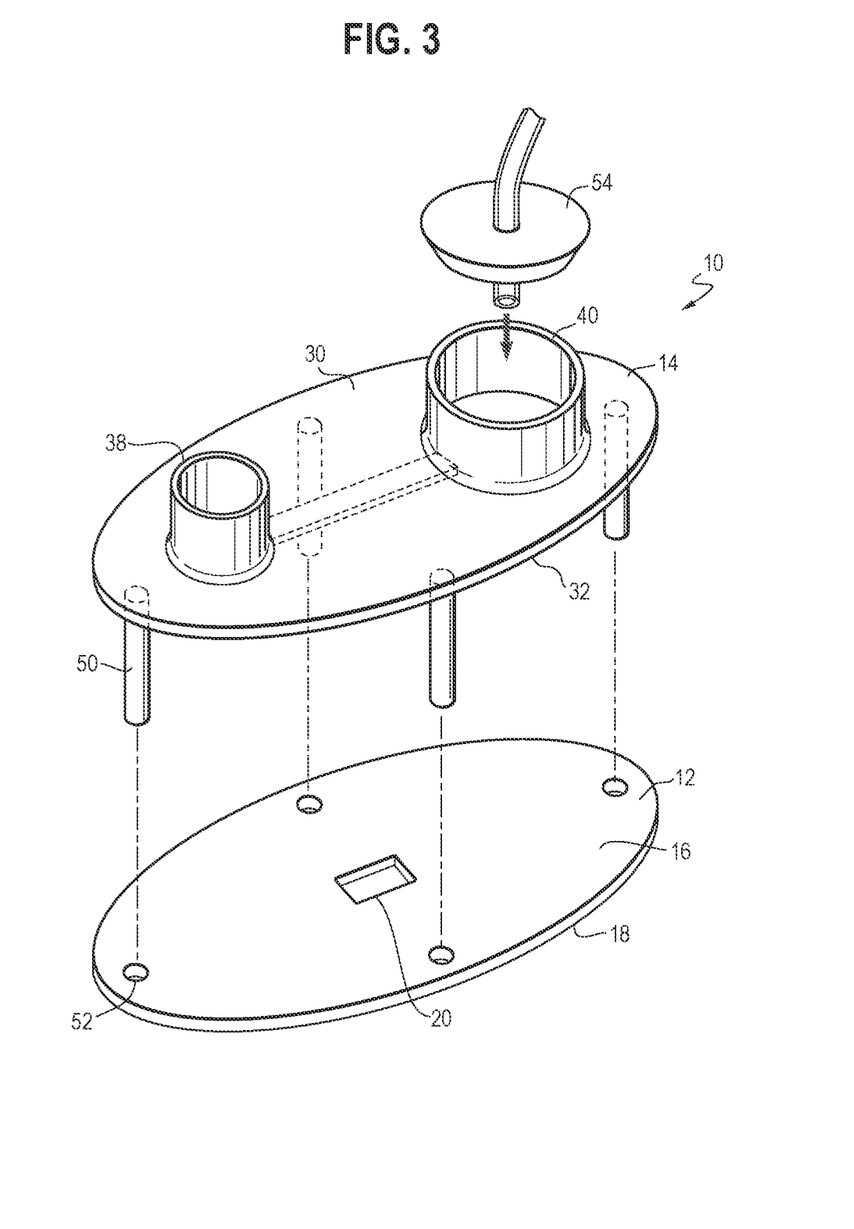
FIG. 3 is an illustration showing a diagrammatic perspective view of another embodiment of a system for automated permeation of a biological material in accordance with certain aspects of the present disclosure.

In some embodiments, the lower and upper portions 12 and 14 may be configured such that when the upper portion 14 is coupled to (e.g., placed upon) the lower portion 12, the top surface 16 of the lower portion 12 sealingly engages the lower surface 32 of the upper portion 14, thereby sealing the channel 48, such that liquids introduced into the system 10, through one of the first and second reservoirs 42 and 44, may flow along the channel 48 and past the groove 20, as discussed in greater detail below. In some embodiments, the lower and upper portions 12 and 14 may remain coupled (closed) by using mechanical clips, magnets, or any other closing mechanism that would create a seal (pressure seal) in the fluid, generically represented in FIG. 2 by diagrammatic connection means 47a/47b/47c/47d, which can include any connection-enhancers referenced herein, alone or in combination with each other (including, without limit, one or more of magnets, clips, flexible seals, adhesive material/structure, and hinges) (e.g., only one clip may be needed when the lower and upper portions 12 and 14 are hinged together). In some embodiments, the lower and upper portions 12 and 14 may be magnetized and create a seal based on this. In some embodiments, the upper portion 14 may have a non-toxic rubber or silicone liner configured to facilitate sealing the channel 48. In some embodiments, as shown in FIGS. 3 and 4, the upper portion 14 may include at least one leg 50 (e.g., a plurality of legs; when the upper portion 14 and the lower portion 12 are hinged together, only one leg 50 may be needed) extending outwardly from the lower surface 32 of the upper portion 14, the lower portion 12 may include at least one aperture 52 (e.g., a plurality of apertures) configured for receiving the at least one leg 50 (e.g., a plurality of apertures are configured for receiving a plurality of legs, respectively) when the upper portion 14 is coupled to the lower portion 12. This embodiment is advantageous for facilitating aligning the lower and upper portions 12 and 14 (e.g., when the lower and upper portions 12 and 14 are not hinged together) before closing, thereby creating a desired sealing of the channel 48.

When the system 10 is used for permeating a biological material 22, the biological material 22 may be placed in the groove before the upper portion 14 is coupled to (e.g., placed upon) the lower portion 12. After the system 10 is closed (e.g., the upper portion 14 is disposed upon the lower portion 12 and sealingly engages the lower portion 12), liquids may be introduced into the system 10 through one of the first and second reservoirs 42 and 44 (e.g., liquids are introduced into the first reservoir 42). The other reservoir (e.g., the reservoir that was not used for introducing liquids into the system 10; the second reservoir 44) may be configured to be coupled to a suction device such that suction applied to the other reservoir (e.g., the second reservoir 44) may cause the liquids to flow along/in the channel 48 and into the groove 20, and may further cause the liquids to flow past the groove 20, along/in the channel 48, and towards/into the other reservoir (e.g., the second reservoir 44). In some embodiments, additionally or alternatively, the reservoir that was used for introducing liquids into the system 10 (e.g., the first reservoir 42) may be configured to be coupled to a positive pressure device such that positive pressure applied to the reservoir that was used for introducing liquids into the system 10 (e.g., the first reservoir 42) may cause the liquids to flow along/in the channel 48 and into the groove 20, and may further cause the liquids to flow past the groove 20, along/in the channel 48, and towards/into the other reservoir (e.g., the second reservoir 44).

As one example, in some embodiments, as shown in FIGS. 1-3, the first reservoir 42 may be configured to allow liquids to be introduced into the system through the first reservoir 42. The first reservoir 42 may be configured to be coupled to a positive pressure device and/or the second reservoir 44 may be configured to be coupled to a suction device such that positive pressure applied to the first reservoir 42 and/or suction applied to the second reservoir 44 may cause liquids introduced into the system 10 through the first reservoir 42 to flow along the channel 48, and into the groove 20, and may further cause the liquids to flow past the groove 20, along the channel 48, and into the second reservoir 44, such that the biological material 22 disposed in the groove 20 may be permeated with the liquids passing through the biological material 22, as discussed in greater detail below. In this embodiment, the second reservoir 44 may also be used as a petri dish in the event that the biological material 22 flows out of the groove 20 and into the second reservoir 44. In some embodiments, as shown in FIG. 3, the system 10 may also include a lid 54 configured to be removably coupled to the second reservoir 44, such that a user may remove the lid 54 and get access to the second reservoir 44 to retrieve the biological material 22 that flows into the second reservoir 44, when needed. It will be appreciated that the system 10 would be configured (e.g., by controlling a predetermined suction (and/or positive pressure) force and rate) to prevent the biological material 22 from washing away, but the removable lid 54 is a precautionary design feature.

Figure 7:
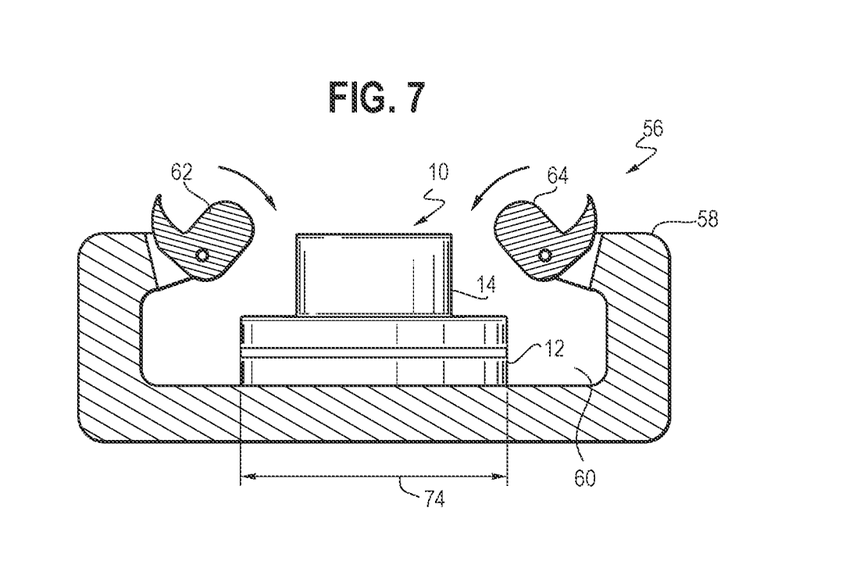
FIG. 7 is an illustration showing a diagrammatic side view of an embodiment of a kit for automated permeation of a biological material, in accordance with certain aspects of the present disclosure, including a closing device in its open position.
Figure 8:
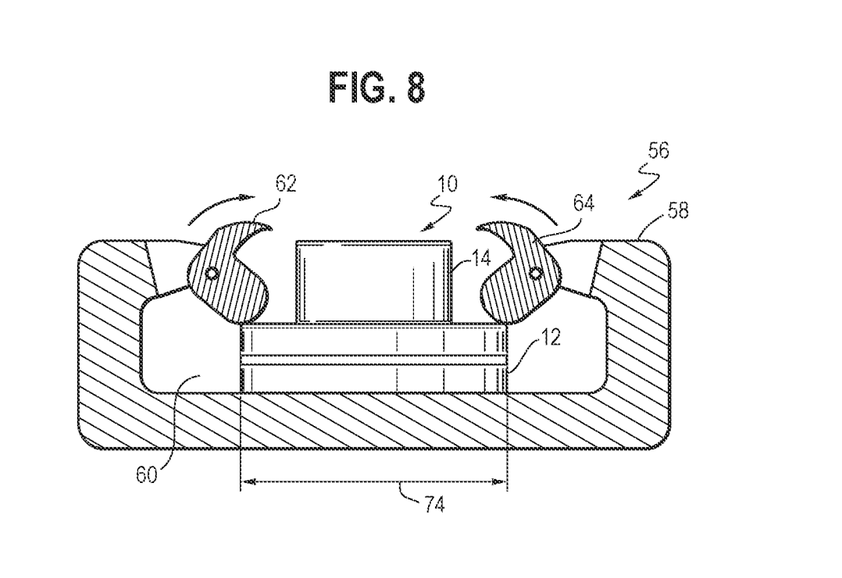
FIG. 8 is an illustration showing another diagrammatic side view of the embodiment of the kit of FIG. 7, in accordance with certain aspects of the present disclosure, including the closing device in its closed position.

In some embodiments, another system may be provided to facilitate sealingly closing the system 10 (e.g., sealingly coupling the upper portion 14 and the lower portion 12). As one example, in some embodiments, as shown in FIGS. 7-8, a kit 56 for automated permeation of a biological material is shown. The kit 56 may include the system 10 and a device 58, where the device 58 may be configured for receivingly support the system 10. The device 58 may include a cavity 60 and at least one arm for closing the system 10 (e.g., only one arm may be needed when the lower and upper portions 12 and 14 are hinged together). The at least one arm is movable (e.g., rotatable) between an open position and a closed position. When the system 10 is placed in the cavity 60 and the at least one arm is in the closed position, the at least one arm may engage an upper surface 30 of the upper portion 14 of the system 10, such that the system 10 is secured within the cavity 60 with the upper portion 14 of the system 10 sealingly engaging the lower portion 12 of the system 10.

In some embodiments, as shown in FIGS. 7-8, the device 58 includes two arms 62 and 64 configured to be movable between an open position and a closed position. When the two arms 62 and 64 are in the open position (e.g., as shown in FIG. 7), the upper portion 14 of the system 10 may be free to be placed onto and removed from the lower portion 12 of the system 10. When the two arms 62 and 64 are in the closed position (e.g., as shown in FIG. 8), the system 10 may be secured within the cavity 60 with the upper portion 14 of the system 10 sealingly engaging the lower portion 12 of the system 10. In some embodiments, as shown in FIGS. 7-8, the two arms 62 and 64 may be rotatable between the open position (e.g., as shown in FIG. 7) and the closed position (e.g., as shown in FIG. 8), and when the two arms 62 and 64 are in the closed position (e.g., as shown in FIG. 8), the two arms 62 and 64 may engage an upper surface 30 of the upper portion 14 of the system 10 placed in the cavity 60 of the device 58. In some embodiments, the device 58 may be part of an equipment that provides suction to the second reservoir 44 of the system 10 and/or provides positive pressure to the first reservoir 42 of the system 10.

In some embodiments, the system 10 may be manufactured out of clear plastic that do not react to the liquids to be used with the system 10 for permeation of the biological material 22 (e.g., cryoprotectant agents in the vitrification solution, discussed below). Potential materials may include acrylics, polycarbonate, cyclic olefin copolymers, or styrene-butadiene-methacrylic co-polymers. Using clear plastic materials is advantageous for allowing a user to monitor the biological material 22 during the permeation process. In some embodiments, the system 10 may be manufactured of an opaque or translucent material optionally with a clear window (generically represented in FIG. 1 by diagrammatic windows 49a and 49b) above and/or below the biological material 22 disposed in the system 10 for visualization. In some embodiments, the system 10 may include a total length 72 (e.g., as shown in FIG. 1) between about 3 cm and about 10 cm, with the first and second reservoirs 42 and 44 each having a diameter (e.g., as shown in FIGS. 3 and 4, where the first and second reservoirs 42 and 44 each have a generally circular cross-section) similar to standard laboratory well-plates, between about 1 cm and about 2 cm in diameter and between about 1 cm and about 2 cm in height. The loading reservoir (the reservoir used for introducing liquids into the system 10, e.g., the first reservoir 42) may be configured for a volume between about 0.5 ml and about 5 ml. The waste reservoir (the reservoir not used for introducing liquids into the system 10, e.g., the second reservoir 44) may have the capacity to hold up to three times the volume of the loading reservoir (e.g., the first reservoir 42). The width 74 (e.g., as shown in FIGS. 7 and 8) of the system 10 may be between about 2 cm to about 5 cm. The channel 48 may have a generally square cross-section between about 0.5 mm and about 5 mm wide. The groove 20 for the biological material 22 may range from about 0.5×0.5×0.5 mm to about 3×3×3 mm. The term "about" is specifically defined herein to include the specific value referenced as well as a dimension that is within 5% of the dimension both above and below the dimension.

A method of permeating a biological material 22 using the system 10 will be described below. A user may place a biological material 22 in the groove 20 of the lower portion 12 of the system 10. Then the user may couple the upper portion 14 of the system 10 to the lower portion 12 of the system 10 (e.g., by placing the upper portion 14 upon the lower portion 12). Then the user may place a first liquid into the first reservoir 42 and apply a first suction to the second reservoir 44 (and/or apply a first positive pressure to the first reservoir 42) such that the first liquid flows along the channel 48 into the groove 20 and permeate the biological material 22, and may further flow past the groove 20 towards the second reservoir 44. It will be appreciated by varying the suction (and/or positive pressure) force, rate and/or duration, the permeation process (e.g., rate, degree, and duration of the permeation) will be varied as desired and/or needed. That is, the user may apply the first suction (and/or the first positive pressure) at a predetermined force, rate, and duration such that the biological material 22 is permeated with the first liquid in a predetermined manner. It will be appreciated that one or more liquids (e.g., a second liquid) may be sequentially introduced into the system 10 and one or more suctions (e.g., a second suction) may be correspondingly applied to the second reservoir 44 (and/or one or more positive pressures (e.g., a second positive pressure) may be correspondingly applied to the first reservoir 42), such that the one or more liquids may sequentially flow along the channel 48 into the groove 20, and the biological material 22 may be permeated with the one or more liquids, as desired and/or needed. It will be appreciated that the permeation process may be automated by presetting the type and order of the one or more liquids to be introduced into the system 10, the suctions to be applied to the second reservoir 44, and/or positive pressures to be applied to the first reservoir 42 (e.g., presetting the force, rate, and duration of each suction (and/or positive pressure), and the time interval between the suctions (and/or positive pressures) if more than one suction (and/or positive pressure) is applied).

In some embodiments, the system 10 may be used with cryoprotectant solutions for cryopreservation of a biological material such that the biological material is ready for vitrification. While a system 10 for permeation of an embryo for cryopreservation of the embryo is specifically described below, the system 10 may be successfully implemented for use with other types of liquids and/or other types of biological materials (e.g., oocytes or another cell type) for other medical and/or experimental uses. For the sake of brevity, a system disclosed below is described and depicted as a system for cryopreservation of an embryo, one of ordinary skill in the art, with a thorough review of the subject specification and figures, would readily comprehend how the system may be implemented for automated permeation of other types of biological materials with the same or other types of liquids for the same or other medical and/or experimental uses, and would comprehend which other types of biological materials, liquids, and uses might be suitable without undue experimentation.

When the system 10 is used for cryopreservation of an embryo 22, the system 10 may be provided with cryoprotectant solutions with different concentrations. In some embodiments, increasing concentration of cryoprotectant solutions may be sequentially introduced into the system 10 via the first reservoir 42, and corresponding suctions may be applied to the second reservoir 44 (and/or corresponding positive pressures may be applied to the first reservoir 42), such that the embryo 22 disposed in the groove 20 may be permeated with increasing cryoprotectant concentrations in a desired manner, and such that when the permeation process is completed, the embryo 22 is ready for vitrification. For the sake of brevity, the method of using the system 10 for cryopreservation of the embryo 22 using three liquids will be described below. A person of ordinary skill in the art will understand how to use the system 10 for cryopreservation of the embryo 22 with a greater/smaller number of liquids.

For example, after the system 10 is closed with the embryo 22 disposed in the groove 20, a first liquid with a first cryoprotectant concentration may be introduced into the system 10 via the first reservoir 42. Then a first suction may be applied to the second reservoir 44 (and/or a first positive pressure may be applied to the first reservoir 42), which causes the first liquid to flow along the channel 48 into the groove 20 and permeate the embryo 22. After allowing the embryo 22 to be permeated with the first liquid for a first predetermined time, a second liquid with a second cryoprotectant concentration, greater than the first cryoprotectant concentration, may be introduced into the system 10 via the first reservoir 42. Then a second suction may be applied to the second reservoir 44 (and/or a second positive pressure may be applied to the first reservoir 42), which causes the second liquid to flow along the channel 48 into the groove 20. The force, rate, and duration of the second suction (and/or the second positive pressure) may be preset and may determine how gradually the second liquid mixes with the first liquid in the groove 20 and forms a first mixed liquid with a first mixed cryoprotectant concentration, and how gradually the embryo 22 is permeated with the first mixed liquid.

After allowing the embryo 22 to be permeated with the first mixed liquid for a second predetermined time, a third liquid with a third cryoprotectant concentration, greater than the second cryoprotectant concentration, may be introduced into the system 10 via the first reservoir 42. Then a third suction may be applied to the second reservoir 44 (and/or a third positive pressure may be applied to the first reservoir 42), which causes the third liquid to flow along the channel 48 into the groove 20. The force, rate, and duration of the third suction (and/or the third positive pressure) may be preset and may determine how gradually the third liquid mixes with the first mixed liquid in the groove 20 and forms a second mixed liquid with a second mixed cryoprotectant concentration, and how gradually the embryo 22 is permeated with the second mixed liquid. After allowing the embryo 22 to be permeated with the second mixed liquid for a third predetermined time, the permeation process may be completed and the system 10 may automatically stop working. The first, second, and third predetermined times may be selected and preset such that when the permeation process is completed, the embryo 22 is ready for vitrification. After the permeation process is completed, a user may open the system 10 and extract the embryo 22 from the groove 20 of the lower portion 12 of the system 10 and place the embryo 22 in a device for vitrification.

It will be appreciated that applying suction to the second reservoir 44 (and/or applying positive pressure to the first reservoir 42) to cause the liquids to flow past the embryo 22 is advantageous for allowing the cryoprotectant concentrations in the groove 20 to increase gradually and allowing the embryo 22 to be permeated with the increasing cryoprotectant concentrations gradually, thereby providing an improved control of the permeation rate. The increasing pattern of the cryoprotectant concentrations in the groove 20 may be varied, as desired and/or needed, by varying the configuration of the system 10 (e.g., the volume of the first reservoir 42, the length, width, and height of the channel 48, the length, width, and depth of the groove 20, and the distance between the first reservoir 42 and the groove 20) and/or the suction (and/or positive pressure) force, rate, and duration, such that desired and/or needed mixing rates of the first, second, and third liquids may be achieved. The increasing pattern of the cryoprotectant concentrations in the groove 20 may determine how gradually the embryo 22 experiences and uptakes the changes in cryoprotectant concentration.

Figure 9:
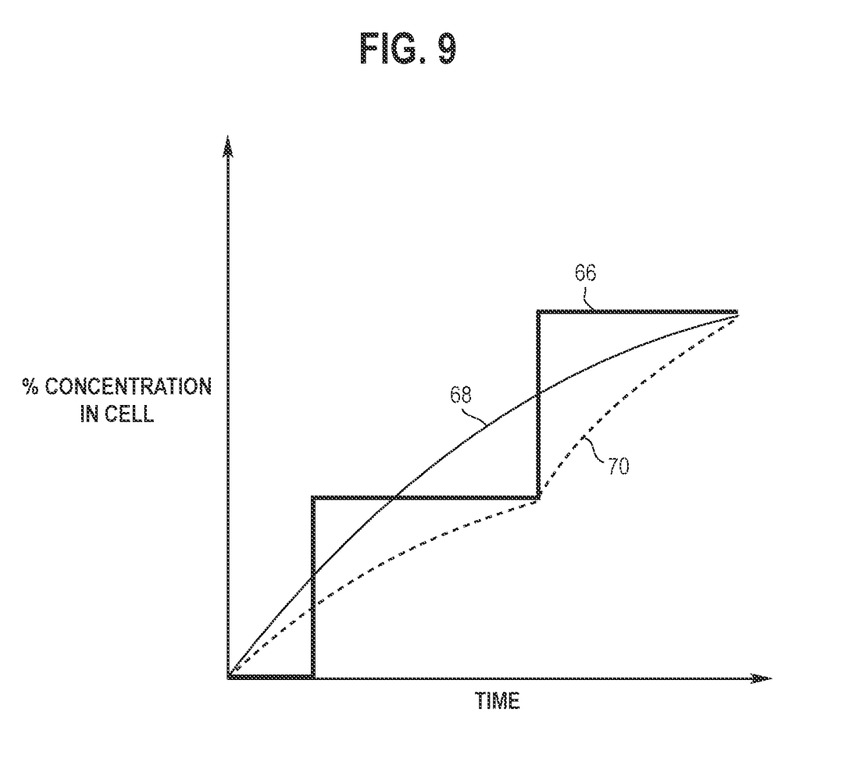
FIG. 9 is an illustration showing the changing process of the concentration of liquids in a biological material during permeation processes in accordance with certain aspects of the present disclosure.

In some embodiments, the system 10 may be configured and the first, second, and third suctions (and/or the first, second, and third positive pressures) may be designed, such that the achieved greatest cryoprotectant concentrations of the first liquid, the first mixed liquid, and the second mixed liquid may be 0%, 17%, and 55% by volume, respectively. As shown in FIG. 9, unlike conventional devices that expose the embryo 22 to increasing concentrations in steps (e.g., as shown as the curve 66, where the embryo 22 experiences two fast increases in cryoprotectant concentration), the system 10 may allow the embryo 22 to be exposed gradually to the final cryoprotectant concentration (e.g., as shown as the curve 68, when the user places a fully-concentrated vitrification solution on the loading reservoir (e.g., the first reservoir 42), or as shown as the curve 70, when the user adds increasing concentrations to slow down the permeation process even further).

While various embodiments of the present disclosure have been described, the present disclosure is not to be restricted except in light of the attached claims and their equivalents. One skilled in the relevant art will recognize that numerous variations and modifications may be made to the embodiments described above without departing from the scope of the present invention, as defined by the appended claims. Moreover, the advantages described herein are not necessarily the only advantages of the present disclosure and it is not necessarily expected that every embodiment of the present disclosure will achieve all of the advantages described.

I claim:

1. A device for permeation of a biological material, comprising:
a lower portion; and
an upper portion configured to be releasably coupled to the lower portion,
wherein the lower portion includes a groove configured to receivingly support a biological material,
wherein the lower portion and the upper portion are coupled such that a first reservoir and a second reservoir are formed collectively by the lower portion and the upper portion,
wherein the first reservoir, the second reservoir, and the groove are in fluid communication with each other,
wherein the groove includes a first section and a second section, and wherein the first section extends from a top surface of the lower portion to an intermediate surface of the lower portion and the second section extends from the intermediate surface of the lower portion towards a bottom surface of the lower portion,
wherein the intermediate surface extends at a different orientation from side surfaces of the groove between the top surface and the bottom surface, and
wherein a first height between the top surface and the intermediate surface is a portion of a second height between the top surface and the bottom surface.

2. The device of claim 1, wherein the groove is disposed between the first reservoir and the second reservoir.

3. The device of claim 1,
wherein the device is made of clear plastic, or
wherein the device is made of an opaque or translucent material with a clear window above and/or below a biological material disposed in the device for visualization.

4. The device of claim 1, wherein the lower portion and the upper portion are connected by a hinge, a mechanical clip, magnets, flexible seals, or any combination thereof.

5. The device of claim 1, wherein the second reservoir is configured to be coupled to a suction device and/or the first reservoir is configured to be coupled to a positive pressure device.

6. The device of claim 5, wherein the lower portion and the upper portion are configured such that a liquid placed in the first reservoir can flow past the groove towards the second reservoir through a suction applied to the second reservoir and/or through a positive pressure applied to the first reservoir.

7. The device of claim 1, wherein the groove extends from the top surface of the lower portion towards the bottom surface of the lower portion.

8. The device of claim 7, wherein the upper portion includes an upper surface and a lower surface, wherein the lower surface of the upper portion includes a first opening, a second opening, and a slot disposed between and in fluid communication with the first and second openings, and wherein the slot extends from the lower surface of the upper portion towards the upper surface of the upper portion.

9. The device of claim 8, wherein when the upper portion is coupled to the lower portion, the slot and the top surface of the lower portion collectively form a channel in fluid communication with the first and second reservoirs, and the groove is in registry with the channel.

10. The device of claim 9, wherein when the upper portion is coupled to the lower portion, the top surface of the lower portion sealingly engages the lower surface of the upper portion such that a liquid introduced into the first reservoir flows, in the channel, towards the second reservoir when a suction is applied to the second reservoir and/or when a positive pressure is applied to the first reservoir.

11. The device of claim 8, wherein the upper portion includes a first protrusion extending outwardly from the upper surface of the upper portion and in fluid communication with the first opening, and wherein the upper portion includes a second protrusion extending outwardly from the upper surface of the upper portion and in fluid communication with the second opening.

12. The device of claim 11, wherein when the upper portion is coupled to the lower portion, the first protrusion and the top surface of the lower portion collectively form the first reservoir, and the second protrusion and the top surface of the lower portion collectively form the second reservoir.

13. The device of claim 8, wherein the upper portion includes at least one leg extending outwardly from the lower surface of the upper portion, and wherein the lower portion includes at least one aperture configured for receiving the at least one leg when the upper portion is coupled to the lower portion.

14. A kit for permeation of a biological material, comprising:
   a first device including a lower portion and an upper portion, wherein the upper portion is releasably coupled to the lower portion,
   wherein the lower portion includes a groove configured to receivingly support a biological material,
   wherein the groove includes a first section and a second section,
   wherein the first section extends from a top surface of the lower portion to an intermediate surface of the lower portion and the second section extends from the intermediate surface of the lower portion towards a bottom surface of the lower portion
   wherein the intermediate surface extends at a different orientation from side surfaces of the groove between the top surface and the bottom surface, and
   wherein a first height between the top surface and the intermediate surface is a portion of a second height between the top surface and the bottom surface; and
   a second device configured to receivingly support the first device,
   wherein the second device includes a cavity and at least one arm movable between an open position and a closed position, and
   wherein when the at least one arm is in the closed position, the first device is secured within the cavity with the upper portion of the first device sealingly engaging the lower portion of the first device.

15. The kit of claim 14, wherein the at least one arm is rotatable between the open position and the closed position, and wherein when the at least one arm is in the closed position, the at least one arm engages an upper surface of the upper portion of the first device placed in the cavity of the second device.

16. A method of permeating a biological material using a device comprising:
   a lower portion; and
   an upper portion configured to be releasably coupled to the lower portion,
   wherein the lower portion includes a groove configured to receivingly support a biological material,
   wherein the lower portion and the upper portion are coupled such that a first reservoir and a second reservoir are formed collectively by the lower portion and the upper portion,
   wherein the first reservoir, the second reservoir, and the groove are in fluid communication with each other,
   wherein the groove includes a first section and a second section, and wherein the first section extends from a top surface of the lower portion to an intermediate surface of the lower portion and the second section extends from the intermediate surface of the lower portion towards a bottom surface of the lower portion,
   wherein the intermediate surface extends at a different orientation from side surfaces of the groove between the top surface and the bottom surface, and
   wherein a first height between the top surface and the intermediate surface is a portion of a second height between the top surface and the bottom surface, the method comprising:
   placing a biological material in the groove of the lower portion;
   coupling the upper portion to the lower portion;
   placing a first liquid into the first reservoir; and
   applying a first suction to the second reservoir such that the first liquid flows along the channel into the groove.

17. The method of claim 16, wherein applying a first suction to the second reservoir includes applying the first suction at a predetermined rate such that the biological material is permeated with the first liquid in a predetermined manner.

18. The method of claim 16, further comprising applying the first suction to the second reservoir such that the first liquid flows along the channel, into the groove, and towards the second reservoir.

19. The method of claim 16, further comprising:
   placing a second liquid into the first reservoir; and
   applying a second suction to the second reservoir such that the second liquid flows along the channel into the groove.

20. The device of claim 1, wherein the lower portion includes a portion of a vitrification stick.

\* \* \* \* \*